United States Patent [19]
Tilford et al.

[11] Patent Number: 5,915,020
[45] Date of Patent: Jun. 22, 1999

[54] PORTABLE SATELLITE EARTH STATION

[75] Inventors: Arthur R. Tilford, Yorba Linda; James D. Allen, Westlake Village; David J. Kuether, Walnut, all of Calif.

[73] Assignee: Hughes Electronics Corporation, El Segundo, Calif.

[21] Appl. No.: 08/897,883

[22] Filed: Jul. 21, 1997

Related U.S. Application Data

[63] Continuation-in-part of application No. 08/560,230, Nov. 21, 1995, abandoned.

[51] Int. Cl.$^6$ .............................. H04N 7/167; H04N 7/14; H04N 7/12; H04B 1/38
[52] U.S. Cl. .............................. 380/10; 348/15; 348/438; 455/3.2; 455/89
[58] Field of Search .......................... 380/9, 10; 348/15, 348/438; 455/3.2, 89

[56] References Cited

U.S. PATENT DOCUMENTS

| | | |
|---|---|---|
| 4,710,778 | 12/1987 | Radov . |
| 5,334,990 | 8/1994 | Robinson . |
| 5,351,130 | 9/1994 | Dugan et al. . |
| 5,404,583 | 4/1995 | Lalezari et al. . |
| 5,416,730 | 5/1995 | Lookofsky . |
| 5,463,261 | 10/1995 | Skarda et al. . |
| 5,470,233 | 11/1995 | Fruchterman et al. . |
| 5,477,263 | 12/1995 | O'Callaghan et al. . |
| 5,510,778 | 4/1996 | Krieter et al. . |
| 5,528,248 | 6/1996 | Steiner et al. . |
| 5,533,123 | 7/1996 | Force et al. . |
| 5,537,157 | 7/1996 | Washino et al. . |
| 5,537,343 | 7/1996 | Kikinis et al. . |
| 5,542,104 | 7/1996 | Ozawa et al. . |
| 5,603,102 | 2/1997 | Rebec et al. . |

FOREIGN PATENT DOCUMENTS

| | | |
|---|---|---|
| 0245132 | 10/1988 | Japan . |
| 0233924 | 9/1989 | Japan . |
| 404357719 | 12/1992 | Japan . |
| 406090196 | 3/1994 | Japan . |
| 406188760 | 7/1994 | Japan . |

OTHER PUBLICATIONS

Pro Band International, Inc. "Eagle Aspen ™ DBS to–GO" Literature.
Mobile Satellite Products Corporation, "LYNXX® Transportable Inmarsat–B" Literature.
NEC Newscope "ATM–To–The–Home Broadband Access" Literature.
Personal Computer Memory Card International Association (PCMCIA) "Black Box Explains . . . " Literature.
SATCOM Electronics "SatCom PASSPort" Literature.

Primary Examiner—Stephen C. Buczinski
Attorney, Agent, or Firm—John A. Crook; Michael W. Sales

[57] ABSTRACT

A portable device for receiving satellite signals and displaying the signals as video. Preferably, the device includes a portable supporting member such as a hinged enclosure case, a satellite antenna, and a display monitor. The satellite antenna is preferably of a flat configuration and is mounted to the support, and the display monitor is preferably a flat video screen mounted to the same support. The required satellite receiver electronics and video decoder may be mounted to the portable support and powered by one or more batteries to provide an integrated and easily transported system to receive and view video relayed by satellite. A PCMCIA card slot and a microcontroller can be provided with the device to provide additional features such as cellular modem use, PCS wireless access, RS-232 port emulation, or GPS position location.

87 Claims, 9 Drawing Sheets

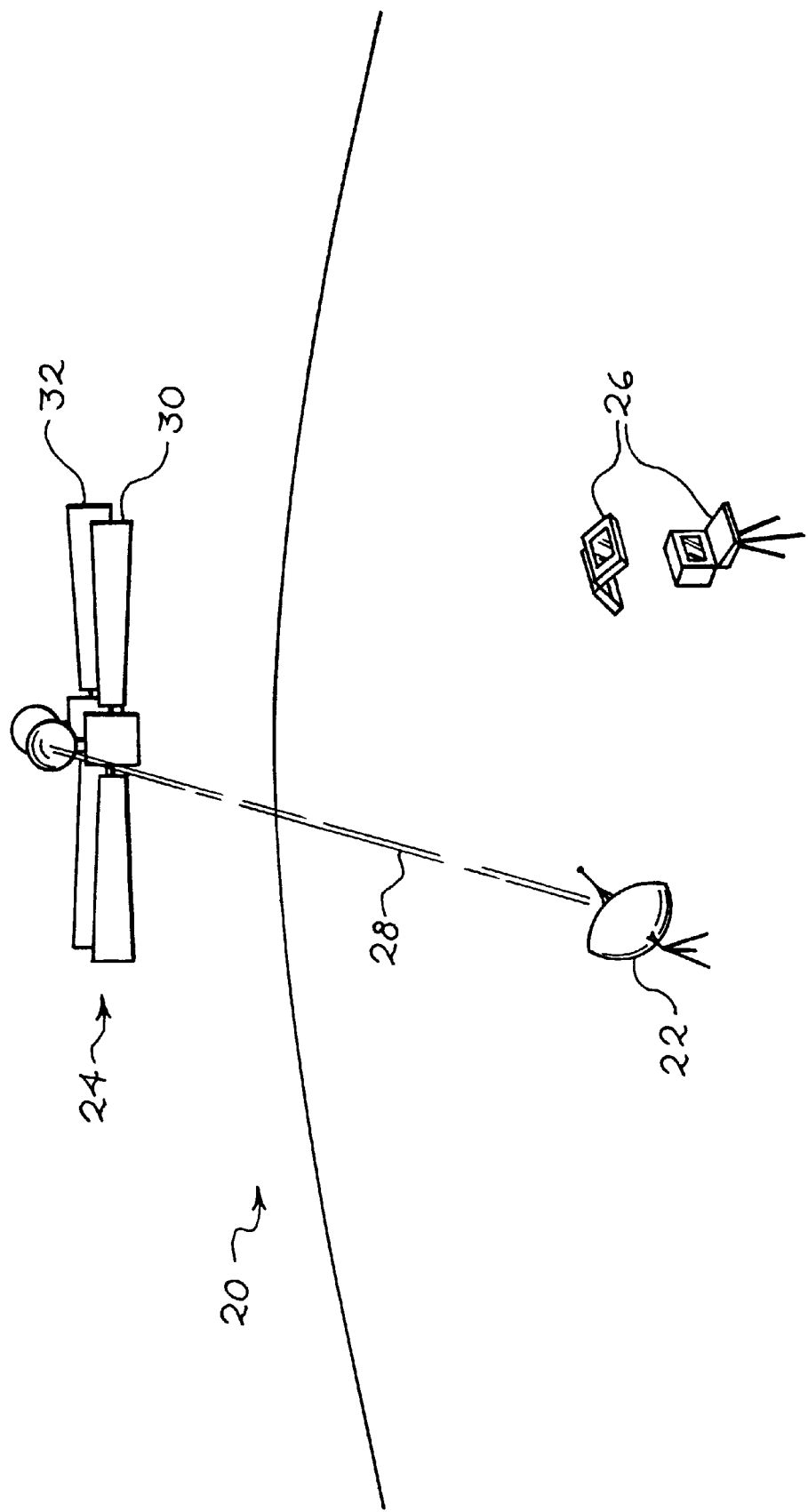

PORTABLE SATELLITE EARTH STATION

RELATED APPLICATIONS

This is a continuation-in-part of U.S. application Ser. No. 08/560,230 filed Nov. 21, 1995, now abandoned.

FIELD OF THE INVENTION

The present invention relates in general to satellite receivers. More particularly, it relates to a portable satellite receiver earth station capable of receiving and displaying satellite broadcasts.

BACKGROUND OF THE INVENTION

Advances in digital satellite technology have resulted from a combination of improvements in digital compression techniques, forward error correction, and integrated circuit (IC) technology. These advances have given users of satellite systems the ability to communicate between distant points on the globe via orbiting relay satellites. These systems provide the capability of transmitting or receiving video, audio or data nearly instantaneously.

Data relayed from satellite systems can be especially useful to personnel who require instantaneous access to large amounts of data while in remote field locations. This data can include audio, video, or other information needed to facilitate the performance of field-related tasks. For example, groups of military troops could benefit from viewing video maps transmitted to the field by forward reconnaissance aircraft via relay satellites. Search-and-rescue operations could also benefit from sharing information instantaneously among constantly moving personnel scattered throughout a large geographic area. Furthermore, satellite-relayed television would certainly be useful in remote outdoor recreational activities.

Presently available consumer satellite receiver systems may also transmit television, audio, or data signals which can be useful in the field. For example, new digital direct broadcast satellite (DBS) systems, which can allow the reception of over 100 channels of digital satellite television using small, affordable satellite receiver antennas, may be used to implement the above audio, data, or image reception requirements in remote areas.

Modern direct broadcast satellites transmit with significantly greater output power than conventional satellites. Signals transmitted from these high-power DBS satellites reach the earth with an effective power several orders of magnitude greater than signals broadcast from conventional satellites. In addition, new gallium arsenide (GaAs) IC amplifiers have significantly improved the sensitivity of the receiver electronics. Accordingly, the size of the antenna required to receive DBS television programming has been reduced from several meters to 18 inches or less in diameter.

Despite the significant reduction in the size of the required antenna, DBS television reception has been generally limited to fixed, permanent installations. In a typical installation, the DBS antenna is aimed at the desired satellite and permanently mounted outside the subscriber's home. A coaxial cable from the antenna is run to an integrated receiver/decoder (IRD) unit located inside the home. The IRD is typically housed in a VCR-sized consumer electronics unit requiring a 110-volt AC electrical power source. During operation, the IRD receives a satellite signal and outputs a television signal suitable for display on a household television set, which itself usually requires a large power source.

Therefore, DBS satellite television reception is not generally available where a permanently mounted fixed receiver dish antenna is unfeasible or where available power is limited. For example, few options exist for installing DBS systems on boats, recreational vehicles, or campers. Current approaches for offering transportable DBS television reception often use the same cumbersome devices used in permanent installations such as a parabolic reflector antenna and a bulky television monitor to display the images. One approach includes a tripod mount for temporarily positioning the parabolic reflector antenna. Another approach includes a smaller (14-inch) antenna with temporary mounts and a DC-to-AC power converter which can operate the IRD unit off of a battery supply.

Furthermore, satellite signal decoders are generally not capable of providing services other than satellite signal decoding. It would be beneficial, however, to provide a stationary or portable satellite signal decoder with the ability to provide numerous other user services besides satellite signal decoding to make these devices more versatile.

As a result, many needed applications of highpower satellite communications systems remain untapped. Various consumer and/or field uses, such as the search-and-rescue or military reconnaissance applications described above, could benefit from the use of DBS technology to facilitate audio, video, or data reception in remote areas or to constantly moving personnel.

SUMMARY OF THE INVENTION

The present invention provides a portable earth station capable of receiving satellite-relayed digital broadcasts. The invention may be embodied in a portable device which allows for the reception, processing, and/or display of satellite broadcasts from a wide range of itinerant reception locations. Preferably, the inventive device includes a supporting member such as an enclosure case, a satellite antenna, and a display monitor. The satellite antenna and display monitor are preferably of a flat configuration to allow them to be mounted to the same support. The flat antenna is preferably mounted within the enclosure case or to the exterior of the enclosure case. An internal battery pack and power supply can provide power to operate these electrical components. Alternatively, an AC power supply may be used to provide outboard, external, or auxiliary power to the components.

By mounting these components in close proximity on a portable support such as an enclosure case, the device can be transported to different locations to receive satellite signals with a minimum amount of setup and configuration. Furthermore, the additional electronic components of a conventional satellite receiver system, such as a satellite receiver downconverter and a video decoder, may also be mounted to the portable support to provide an integrated system for receiving and displaying video transmitted via satellite.

The satellite receiver components also preferably include a tuner/demodulator, inverse forward error correction logic and transport logic. The tuner/demodulator tunes and demodulates one of the downconverted satellite carrier signals. Inverse forward error correction (FEC-$^{-1}$) corrects errors in the received signal, and transport logic decodes the encrypted video signal. The video decoder preferably includes an MPEG decoder and an NTSC encoder/digital-to-analog converter (DAC). The MPEG encoder decompresses the compressed video data stream and the NTSC decoder converts the digital data stream to an analog television signal for display on a flat video display monitor.

In another aspect of the invention, instead of a video display mounted to the support, the satellite receiver electronic components are preferably mounted to the support along with the satellite antenna. This configuration provides a portable system for use with outboard audio components or remote video display devices. Furthermore, a conventional portable personal computer may be utilized for the video display.

In yet another aspect of the invention, a pair of hingeably connected panels provides a free-standing enclosure for mounting a satellite receive antenna and a display monitor. Preferably, the receive antenna is flat and is mounted on the outside face of one of the panels, and the display monitor is mounted on the other panel. The electronic components may also be mounted on or within the enclosure. The antenna may also be mounted to one of the panels using a hinged connection to allow the antenna to be pointed skyward independently of the panels.

In yet another aspect of the invention, the receiver antenna, satellite receiver electronics, video decoder, and display are preferably mounted in or on a hinged enclosure. An internal component frame protects the electronics and other internal devices from damage. The display monitor is also preferably mounted to the internal component frame. The internal component frame fits within the enclosure case and is protected from shock by dampening devices. The frame is also removable from the case for access to the internal components.

In yet another aspect of the invention, the portable satellite receiver comprises a hingeably connected, flip-up color LCD viewing screen, flip-out or fold-out stereo speakers, a flat antenna, and a user control panel integrated into a compact, unitary housing. The user control panel provides various dedicated user interface controls such as volume, tone, and balance controls as well as navigational controls including, for example, guide, select, and directional keys. A modem and a Personal Computer Memory Card International Association (PCMCIA) card slot are also included to augment functionality of the portable receiver.

According to another aspect of the present invention, a stationary or mobile satellite signal audio/visual receiver system includes a PCMCIA card slot and a microprocessor or controller attached thereto. The PCMCIA card slot accepts standard PCMCIA cards which can be used by the controller to perform functions such as (without limitation) cellular modem use, PCS wireless access, RS-232 port emulation, electronic, magnetic, optical or other forms of storage memory (either permanent or temporary), or GPS position location.

In yet another aspect of the invention, a device for communicating via a satellite is provided that includes a satellite antenna, a display monitor, a video camera, and a microphone all contained within a portable enclosure. The components cooperate to allow the user of the device the ability to communicate in a teleconference format via satellite. Furthermore, the device may include a cellular modem to allow teleconferencing via a terrestrial cellular phone network.

The portable satellite earth station described herein allows a subscriber using a satellite system, such as a DBS system, to receive and view satellite-relayed transmissions in remote areas without the need to transport and configure conventional satellite receiver hardware. The mounting of the satellite receiver antenna, the receiver electronics, and a video display together as shown in the preferred embodiments described herein enhances the mobility and usefulness of the components. Furthermore, with respect to DBS systems, the various portable configurations of the satellite receiver equipment, including the antenna, the receiver electronics, and the display screen, allow these portable configurations to be used with existing equipment in a modular fashion. Still further, the portable (or stationary) satellite earth station uses a PCMCIA card slot to provide user services other than satellite signal decoding.

It is to be understood that both the foregoing general description and the following detailed description are exemplary and explanatory and are intended to provide further explanation of the invention as claimed. The invention, together with the further objects and intended advantages, will best be understood by reference to the following detailed description, taken in conjunction with the accompanying drawings.

BRIEF DESCRIPTION OF THE DRAWINGS

FIG. 1 is a diagram showing a satellite system that incorporates the portable satellite earth station of the present invention.

DETAILED DESCRIPTION OF THE DRAWINGS

Figure 3:
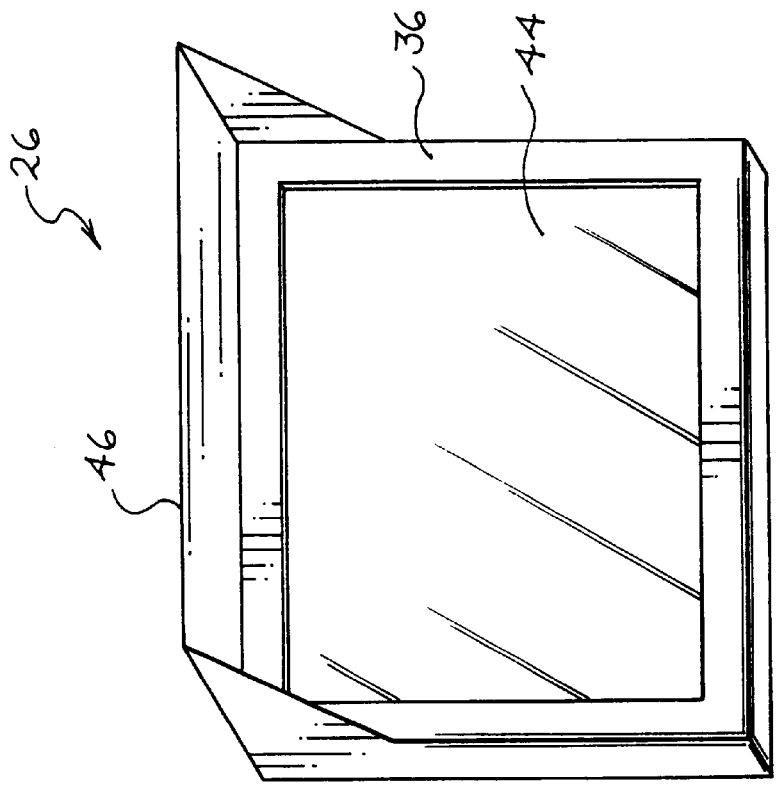
FIG. 2 and FIG. 3 show front and rear views of a preferred embodiment of the portable satellite earth station of FIG. 1.

The present invention includes a portable satellite receiver earth station which incorporates within an integrated unit, such as a unitary housing, the various components necessary for receiving satellite signals. These components can include, for example, a satellite antenna, satellite receive electronics, a video decoder and a display monitor. A power supply is provided to allow portable operation of the device. Preferably, the antenna is integrally mounted within or to the exterior of the housing to allow reception of satellite signals. A display monitor is provided within the housing to display the received programming.

Referring now to the drawings, FIG. 1 illustrates a digital satellite system 20 that incorporates the portable satellite earth station of the present invention. The system 20 preferably includes a ground-based uplink transmitter 22, a space segment 24 and a portable satellite earth station 26.

Ground-based transmitter 22 preferably uplinks a digital signal 28 to one of satellites 30, 32. In a particular application, the digital signals 28 are transmitted to satellites 30, 32 at assigned carrier frequencies between 17.3 GHz to 17.8 GHz. For a direct broadcast satellite (DBS) system, the uplink 28 preferably includes a plurality of 40 Mbps digital signal carriers having an analog bandwidth of 24 MHz.

Adjacent carriers are transmitted with alternating left and right-hand circular polarization to allow frequency overlap of adjacent carriers to conserve available bandwidth. The 24 MHz bandwidth carriers may therefore be spaced with center frequencies only 16 MHz apart. The carriers are quadrature-phase shift keyed (QPSK) modulated, with a symbol rate of 20 Megasymbols/sec, to provide a total bit rate of 40 Mbps.

Satellites 30, 32 receive and translate signal 28 to carrier frequencies between 12.2 GHz to 12.7 GHz for downlink to earth stations. Ordinarily, satellites 30, 32 are geostationary satellites such as a Hughes® HS-601™ spacecraft positioned at a geostationary orbital location at approximately 101 degrees W longitude. In a particular embodiment, satellites 30, 32 transmit via high-power 120 or 240 watt transponders (not shown) to enable DBS reception within the satellite's downlink footprint. Portable earth station 26 located within the satellite's footprint receives the transmitted downlink signal.

Figure 2:
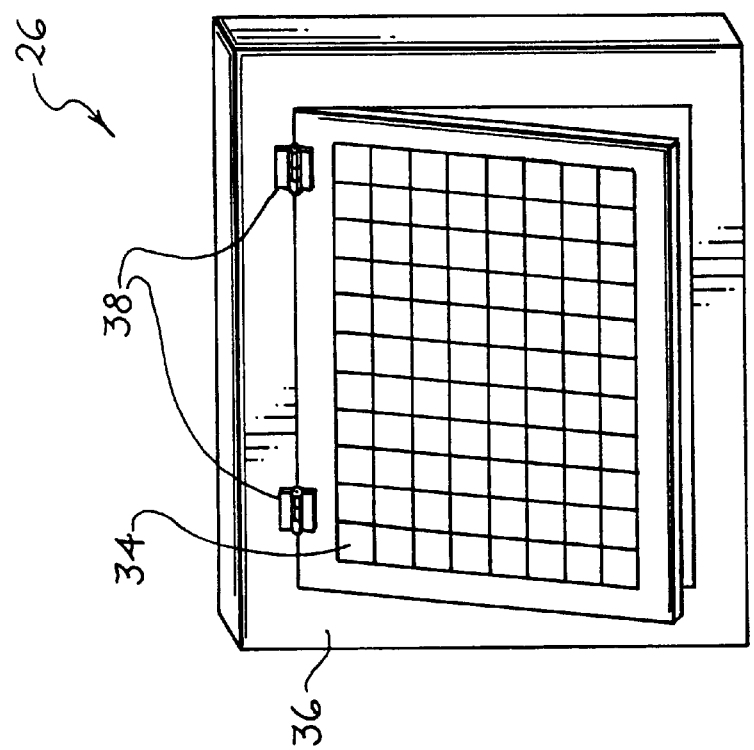

FIG. 2 shows a front view of the portable satellite earth station 26 including a flat satellite antenna 34 fixed to a support or panel 36. Flat-array antennas, (e.g., phased-array, slotted-planar arrays, printed-patch arrays) or reflector and lens systems are also suitable for use in the present invention. The antenna 34 is on the front side of the support 36. The antenna 34 is preferably covered by an electromagnetically transparent radome material such as Lexan® plastic to protect the antenna against weather and debris. The satellite antenna 34 is preferably mounted to the support 36 by a pair of hinges 38 which allow the antenna to swing away from the support 36 for satellite to earth station alignment. A support arm (not shown) or resistive hinges may be provided to hold the antenna at various extended positions.

In a particularly preferred embodiment, the flat antenna 34 utilizes a continuous transverse stub (CTS) element in a parallel plate waveguide antenna as disclosed in U.S. Pat. No. 5,266,961 to Milroy, which is assigned to the same assignee as this application and is incorporated herein by reference. The CTS antenna forms a planar aperture of a maximum area which is compatible with the dimensions of the support 36. The flat antenna is preferably of a slightly smaller dimension than the support 36.

Figure 4:
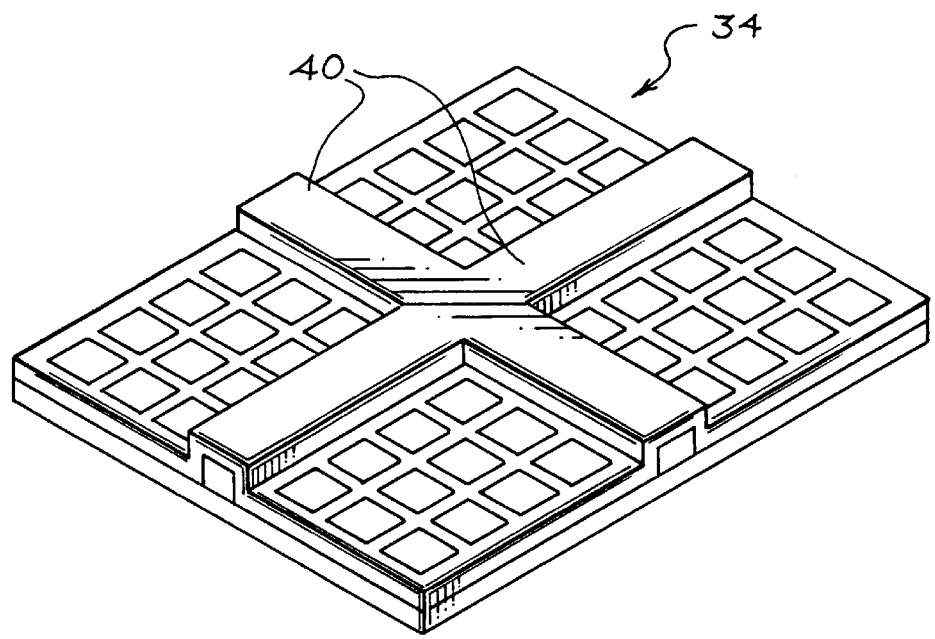
FIG. 4 and FIG. 5 show front and rear views of a continuous transverse stub antenna which may be used in the portable earth station of FIG. 2.
Figure 5:
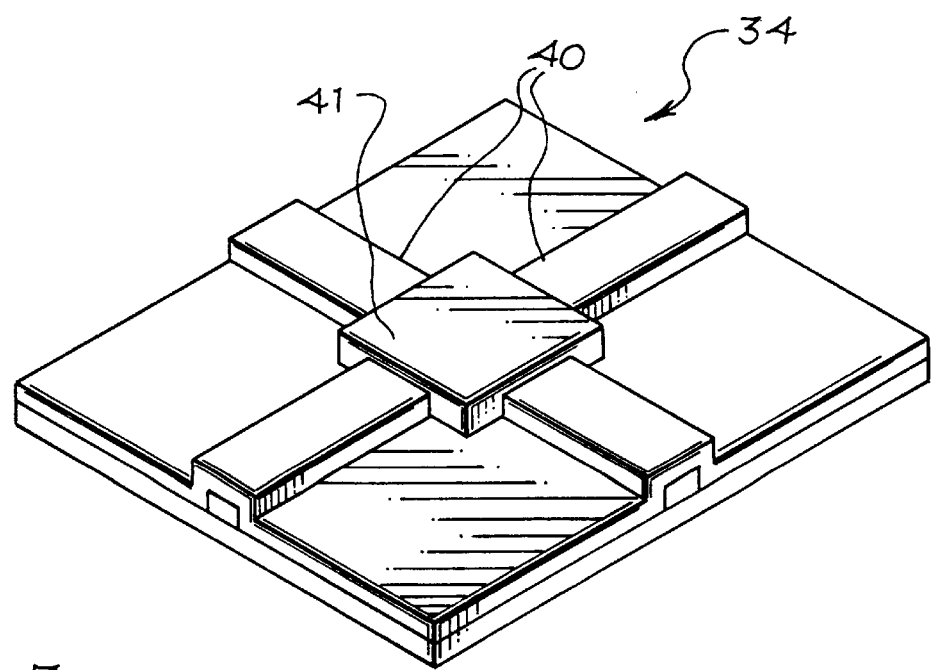

As shown in FIG. 4 and FIG. 5, the CTS antenna directs the received satellite signals to a waveguide 40. A feed/low noise block (LNB) for receiving the desired satellite signals may be mounted to the waveguide 40. In this instance, a circular polarity feed/LNB 41 is fitted to the waveguide section 40 to convert the received satellite signals to the input frequency used by the satellite receiver.

FIG. 3 shows the rear of the portable satellite earth station 26 including a flat screen display 44. The flat screen display 44 may be a liquid crystal display (LCD), gas plasma display or other comparable flat screen monitor. The flat screen display 44 may be housed within the support 36 behind a clear plexiglass cover for protection. Alternatively, the flat display 44 may be mounted on hinges (not shown) similar to the flat antenna 34 to provide for different viewing angles. A shroud or visor 46 may be provided to shield the display 44 from direct sunlight.

As shown in FIG. 2 and FIG. 3, the support 36 may be a single panel with both a flat antenna 34 and flat display monitor 44. In an alternative embodiment shown in FIG. 6, the support may also include a first mounting panel 48 and a second mounting panel 50 joined by a hinge 52. The satellite antenna 47 is positioned on the outside face 54 of a first mounting panel 48. The display monitor 44 is positioned on the outside face 56 of the second mounting panel 50 along with visor 57. The electronics required to receive satellite signals and output to the display are preferably housed in the second mounting panel 50 along with the display monitor 44. A cable may connect signals between the two panels. A discussion of the arrangement of electrical components is provided below in reference to FIG. 8.

Figure 6:
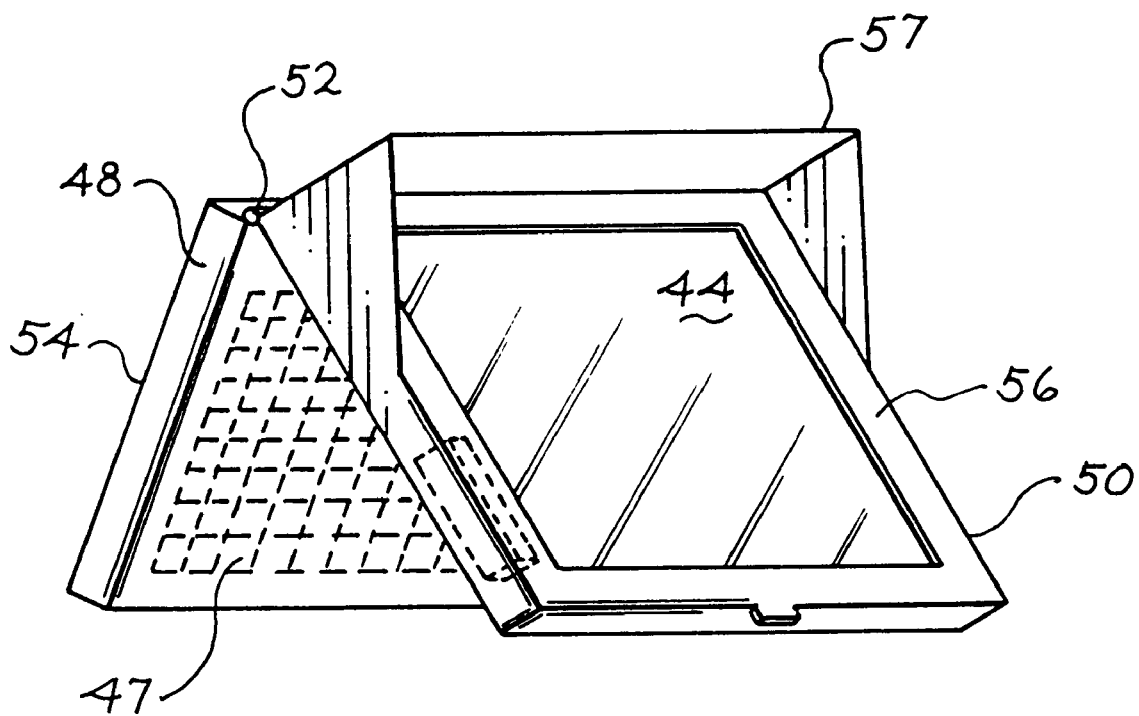
FIG. 6 shows an alternate embodiment of the portable satellite earth station.

Hinge 52 in FIG. 6 may be detachable to allow the separation of the two panels 48, 50. Separating the two panels 48, 50 and incorporating an extended connecting cable allows the satellite antenna 47 to be positioned at an outdoor location advantageous for satellite reception while the display monitor 44 is positioned at a comfortable indoor viewing location.

Figure 7:
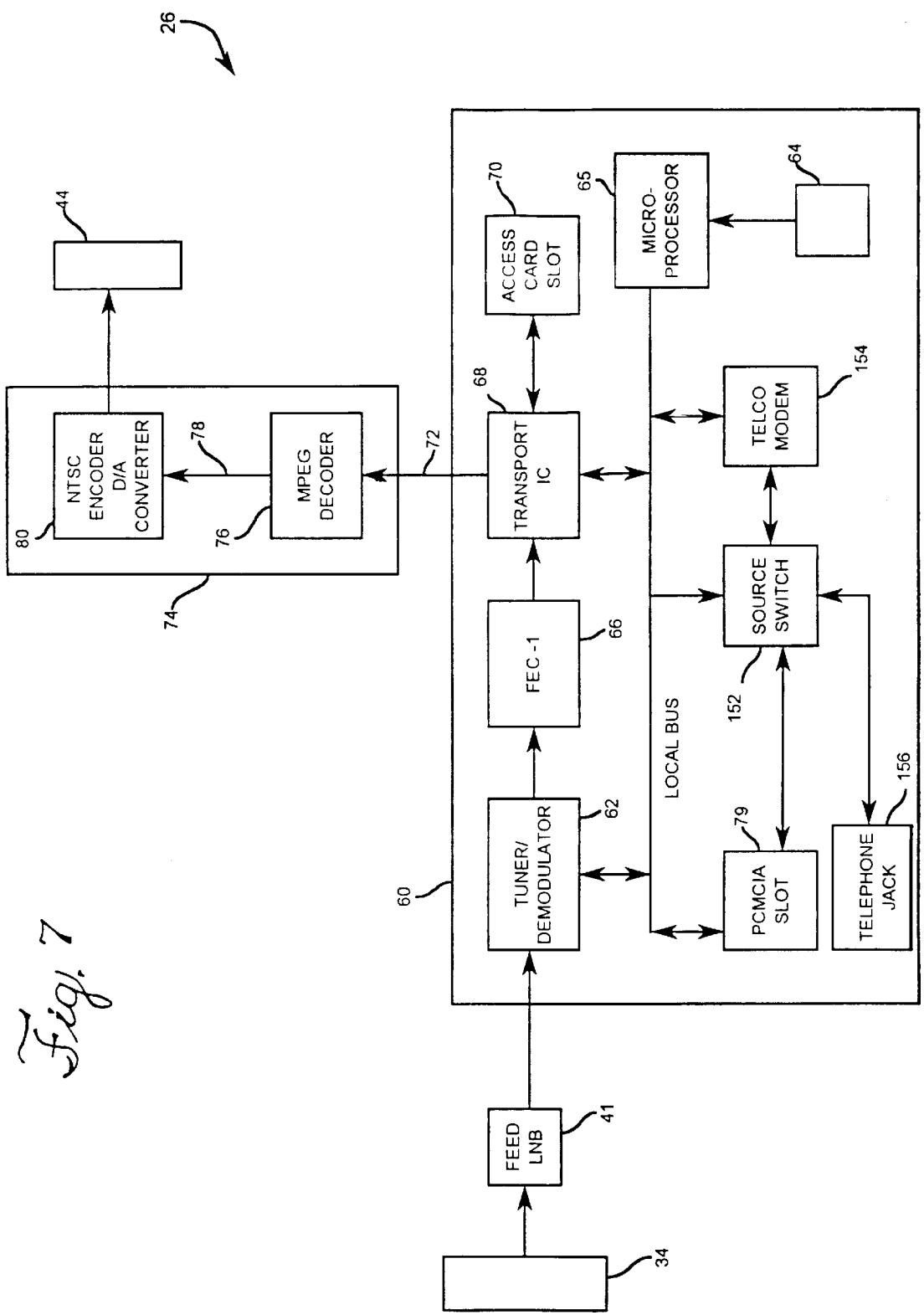
FIG. 7 shows a block diagram of the operational components of the portable satellite earth station of FIG. 2.

FIG. 7 shows a diagram of the operational components of the portable satellite earth station 26. As seen in FIG. 7, the portable satellite earth station 26 receives the transmitted satellite signal via the flat satellite antenna 34. The flat satellite antenna 34, as described in U.S. Pat. No. 5,226,961, directs the signals to the feed/LNB 41. The feed/LNB 41 is capable of receiving left and right-hand circularly polarized, QPSK-modulated signals in the 12.2 to 12.7 GHz frequency range. The feed/LNB 41 converts the focused signals to an electrical current which is amplified and down-converted in frequency. The feed/LNB 41 preferably down-converts signals to carrier frequencies between 950 MHz to 1450 MHz. The feed/LNB 41 also includes an amplifier (not shown), which preferably has a low-noise figure between 1.6 and 0.6 dB. The amplified and down-converted signals are then conveyed via coaxial cable to the satellite receiver 60.

The tuner/demodulator 62 tunes to a selected 40 Mbps carrier signal within the preferred 950 to 1450 MHz frequency range from the output of feed/LNB 41. After tuning the desired carrier, the tuner/demodulator 62 decodes the selected 40 Mbps signal carrier into a digital data stream. Preferably, a remote control device or manual switches 64 are input to a microprocessor 65 which in turn programs the tuner/demodulator 62 to the desired channel.

Inverse forward error correction (FEC-$^{-1}$) logic 66 is provided using standard circuitry or software to detect and correct transmission errors in the data stream. The FEC$^{-1}$ is applied according to the FEC applied at the uplink transmitter 22 (FIG. 1). For example, the FEC is preferably applied at the uplink transmitter 22 (FIG. 1) using a concatenated Reed-Solomon code interleaved with a convolutional code. The concatenated error-correction codes allows for the detection and correction of errors on the uplink or the downlink. The combination of the Reed-Solomon and convolutional error correction codes correct both randomly occurring errors and burst-type errors. Preferably, a first encoding step (outer encoding) comprises conventional Reed-Solomon coding at a 7/8 rate. The encoded bits are then interleaved to widen the coding over a uniform period of time. The interleaving is ordinarily performed using random access memory (RAM) to separate the encoded bits in time. Next, the interleaved bits are preferably encoded again (inner encoding) using a convolutional code at a 2/3 rate.

Of course, other FEC schemes or code rates may be used according to the desired link performance. For example, a typical 40 Mbps DBS carrier with a 7/8 Reed-Solomon code rate combined with a 2/3 convolutional code rate has an information throughput rate of 23.6 Mbps. When the link quality is high and less error correction is required, a 6/7 convolutional code rate may be utilized to increase the information rate. At the 6/7 convolutional code rate, the information throughput of the 40 Mbps carrier is increased to 30.3 Mbps.

Given the preferred concatenated ReedSolomon/ convolutional coding scheme on the transmission side, the $FEC^{-1}$ 66 detects and corrects errors in the received signal data using conventional correlation techniques which reverse the FEC correction scheme utilized on the uplink. The $FEC^{-1}$ first uses a Viterbi decoder to decode the inner-encoded bits, followed by de-interleaving to isolate the coded bits. Lastly, the Reed-Solomon outer encoded bits are decoded to obtain the error-corrected data signal.

After the $FEC^{-1}$ 66 is performed, the encrypted video signal is recovered. The transport logic 68, which is controlled by the microprocessor 65, then decodes the received video signal. The audio signal is preferably not encrypted. In a typical DBS system, an access card (not shown) is required to decrypt the digital video signal. After decryption by the transport logic 68, the compressed video signal 72 is recovered.

The compressed video signal is then processed by the video decoder 74. Video and audio decompression logic 76 decompresses the MPEG-2 compressed signals to recover the digital video or audio signal 78. NTSC encoder/DAC 80 preferably converts the digital video data to a NTSC signal for display on a conventional television monitor. The NTSC signal is then sent to the display monitor 44 to display the received signal.

The satellite receiver 60 and video decoder logic 74 may be implemented with conventional logic devices that are well-known in the art. For example, a microprocessor with random access memory (RAM) and read-only memory (ROM), discrete logic devices (e.g., AND, OR, NAND and NOR gates), field programmable gate arrays (FPGA), and application specific integrated circuits (ASICs) may be used to implement the logic. An example of logic and software capable of implementing the satellite receiver 60 and video decoder 74 is the DSS® receiver, now available from RCA and SONY. Circuitry within the DSS® integrated receiver/ decoder (IRD) tunes to a carrier signal, decodes the signal, and applies the $FEC^{-1}$. The IRD functions are ordinarily performed on a daughterboard mounted within the DSS® unit. After the $FEC^{-1}$, the satellite receiver 60 processes the incoming signal to the video decoder 74, which then produces a television signal. Circuitry such as that found in the IRD may thus form the satellite receiver 60 and video decoder logic 74.

Additional functionality is added to the portable satellite earth station 26 through the use of a PCMCIA slot 79, which may be used to accept a PCMCIA card having an antenna and circuitry that effects cellular telephone communication functions. Such a cellular telephone PCMCIA card enables the earth station 26 to communicate with a service provider via a wireless telephone connection instead of a hardwired connection as is typically the case with stationary satellite signal decoders.

The PCMCIA slot 79 may be connected to a telco modem 154 through a source switch 152. The PCMCIA slot 79 may, in certain embodiments, provide a satellite communication channel between e.g. a cellular telephone PCMCIA card installed in the PCMCIA slot 79 and the microprocessor 65. The PCMCIA slot 79 is also connected to the microprocessor bus to allow microprocessor 65 interface with a PCMCIA card (not shown) which is inserted into the PCMCIA slot 79. A telephone jack 156 may be connected to the source switch 152 enabling the microprocessor 65 to select the input for the telco modem 154 from either the PCMCIA slot 79 (to effect cellular telephone communications) or the telephone jack 156 (to effect hardwired telephone communications).

As will be understood by those skilled in the art, other types of PCMCIA cards may additionally or alternatively be used to augment the functionality of the earth station to allow, for example, PCS wireless access, RS-232 port emulation, GPS position location, additional ROM or recordable memory, access to information such as maps and telephone books, reception of local television, data or other channels including those provided at hotels, campgrounds, etc., as well as other specified functions associated with standard PCMCIA cards.

It should also be understood that other types of satellite receivers or data decoders may be utilized with the present invention. For example, circuitry similar to the satellite data receiver currently available with the DIRECPC® interface card product from Hughes Network Systems® may be utilized to receive satellite data services. This satellite data receiver is similar to the satellite receiver 86 with tuner/ demodulator and $FEC^{-1}$ of FIG. 7, wherein the tuner/ demodulator is provided to receive the assigned satellite frequency.

Figure 8:
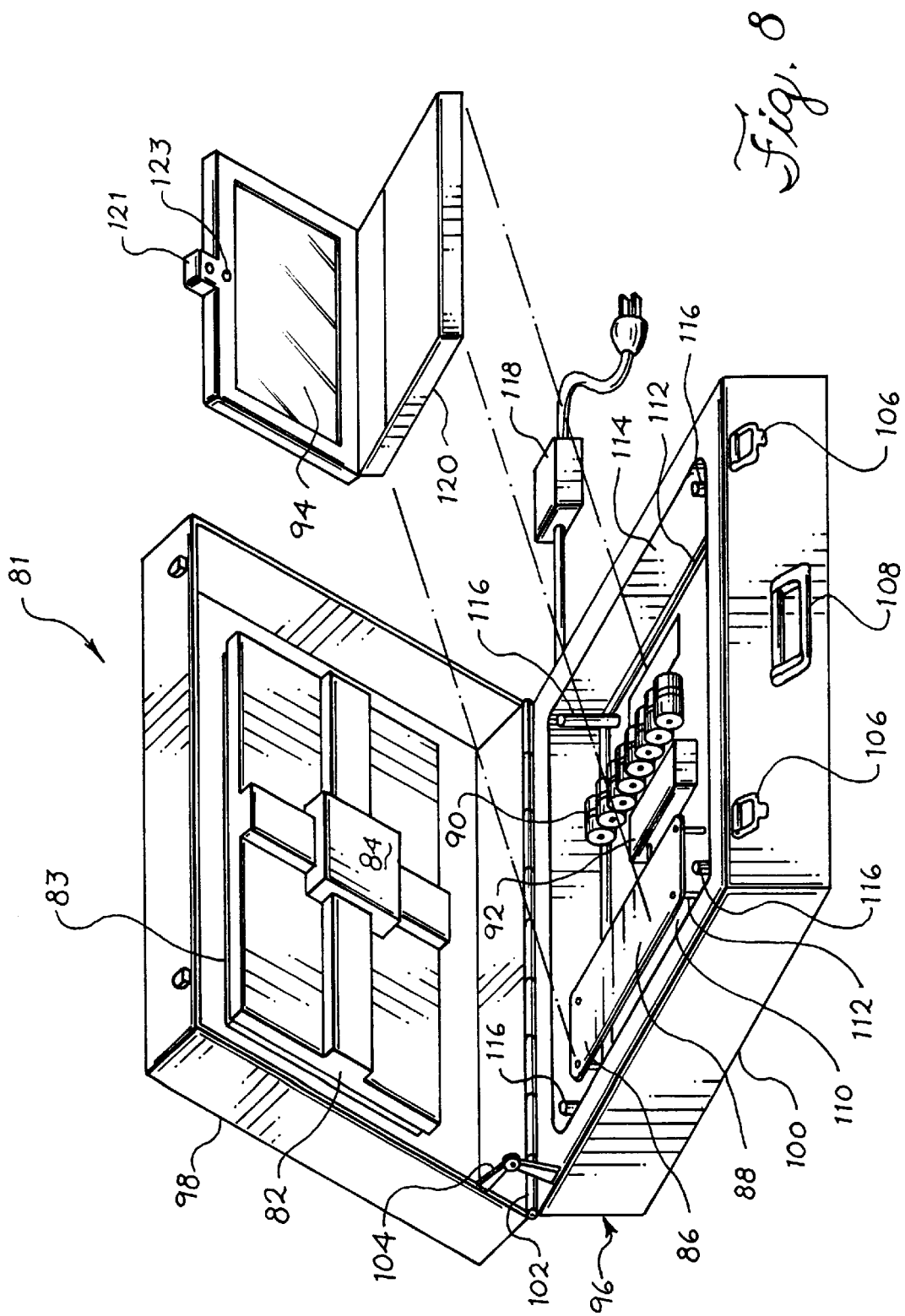
FIG. 8 shows another embodiment of the portable satellite earth station.

FIG. 8 shows another embodiment of a portable satellite earth station 81. As seen in FIG. 8, the portable satellite earth station 81 includes an antenna 82, a feed/low-noise block (LNB) 84, satellite receiver logic 86, a video decoder logic 88, a battery pack 90, a DC-to-DC converter 92 and a display monitor 94 internally mounted within a portable housing or enclosure case 96. The portable enclosure case 96 is preferably constructed of a lightweight, impact-resistant material such as ABS plastic. The enclosure case 96 includes a cover 98 and a base 100 connected by a hinge 102 which allows the enclosure case 96 to open and close. Preferably, the hinge 102 is also releasable. The hinge 102 is supported by strut 104 which can maintain the cover 98 and base 100 open at different positions. The enclosure case 96 preferably has two external latches 106 for securing the hinged case 96 in a closed position. A carrying handle 108 is provided for transporting the enclosure case 96.

Antenna 82 is a "flat" antenna suitable for positioning within the cover 98 of the enclosure case 96. As described in the previous embodiments, flat antennas include array antennas (e.g. slotted planar arrays, printed-patch arrays) or reflector and lens antenna systems. The antenna 82 is preferably mounted within the cover 98, similar to the previous embodiments. The flat antenna 82 is dimensioned to maximize its aperture size, yet still fit within the cover 98. Alternatively, an opening 83 may be provided in the cover 98 through which a hinged antenna 82 mounted within the enclosure case 96 may be extended to receive satellite signals.

Alternatively, the antenna 82 may be mounted to the exterior of the cover 98 through a conventional hinge and strut assembly. With an externally mounted antenna, it is desirable to provide a protective shell which can be fitted over the external antenna assembly to protect the antenna while the unit is not in use.

Preferably, the internal components of the portable satellite earth station are mounted to a rigid internal frame or chassis 110 which fits within the base 100 of the enclosure case 96. In a preferred embodiment, the internal frame 110 may consist of two rigid molded plastic or plexiglass sheets 112, 114 held in a parallel relationship by aluminum posts or standoffs 116. The components may be positioned between the plexiglass sheets 112, 114 for protection and impact isolation. Individual components such as the satellite receive electronics 86 or DC-to-DC converter 92 may be secured to the plexiglass sheet 112 by aluminum standoffs.

The rigid frame 110 is preferably secured to the base 100 of the enclosure 96 by means of velcro strips (not shown) adhered to the inside of base 100. The velcro strips adhere the frame 110 to the base 100 while allowing the frame 110 to be removable to permit access to the internal components. The velcro fastener also acts as a dampener structure between the frame 110 and the enclosure case 96 to protect the internal components from shock. For greater shock resistance and impact tolerance, the internal frame 110 maybe mounted to the base 100 via elastic or rubber bushings (not shown). Of course, the frame or chassis 110 may be rigidly secured to the base 100 with conventional fasteners or adhesives.

The battery pack 90 preferably supplies 12 volts to the DC-to-DC converter 92 to power the unit. Preferably, the battery pack 90 is comprised of eight 1.5-volt rechargeable Nickel Cadmium "D" size cells. Eight "D" cells are capable of providing sufficient current to allow for up to one hour of continuous operation. Alternatively, the battery pack 90 may incorporate other types of electrical storage batteries (e.g, lead acid, nickel hydride, etc.) capable of providing comparable power levels. Thus, in the preferred embodiment, 110-volt AC power is not required to power the unit.

DC-to-DC converter 92 converts the preferred 12-volt input to the voltages necessary to operate the receiver/decoder electronics and the LNB. In a preferred embodiment, a DC-to-DC converter which outputs +5, −5, 14 and 22 volts is utilized.

An external AC transformer 118 may also be provided to operate the device from 110-volt AC power. The AC transformer 118 converts the 110 volts AC to the appropriate DC voltage to supply the DC-to-DC converter 92. The DC voltage supplied by the AC transformer 118 may also be used to recharge the battery pack 90.

In the embodiment shown in FIG. 8, the LCD display of an IBM PC-compatible personal laptop computer 120 is preferably utilized as a video monitor. The laptop personal computer 120 is secured to the top of the internal frame 110 via velcro or other fastener mechanisms. With the laptop personal computer 120 secured to the frame 110, the clearance between the laptop 120 and the antenna 82 secured to the cover 98 of the enclosure case should be sufficient to allow the enclosure case to be closed without the internal components interfering.

When using a conventional laptop computer display, the NTSC signal output from the video decoder logic 88 is input to an NTSC/digital video interface card (not shown). The interface card converts the NTSC signal to a digital video image used by the laptop computer 120, such as 24 bit RGB24. Preferably, the NTSC interface card fits within the PCMCIA format slot now commonly available with most laptop personal computers. An example of one such interface card is available from Nogatech of Israel. However, another PCMCIA slot, or a separate NTSC interface slot, may be provided to allow concurrent use of other PCMCIA cards.

Once the digital video image is interfaced to the laptop computer 120, conventional operating system software, such as any version of Windows, can display the digital video image using the full width of the monitor, or in a window portion of the monitor. With a laptop computer, other application programs may be run simultaneously with the display of the video image. For example, a user may simultaneously edit a document in one window, while watching a sporting event in an other window.

Alternatively, the use of a portable LCD monitor is also preferred. The LCD monitor may be hinged to the internal frame 110 and swung open during use similar to the operation of a laptop computer. Both the stand-alone LCD monitor and the laptop personal computer typically utilize their own battery power supply or transformer. Alternatively, the battery pack 90 and DC-to-DC converter 92 may be modified to accommodate the power requirements of the display monitor.

The illustrated embodiments of the portable satellite earth station should not be limited to the reception and/or display of digital television signals. For example, a speaker system or audio jack for a pair of headphones can be provided and attached to the case 96 to provide audio-only output. In the alternative, the speaker or the audio jack can enhance the sound capability of the laptop computer 120 or display monitor.

The portable satellite earth station thus allows a complete satellite receiver system to be transported and quickly set up to receive satellite transmitted video. To receive digital video signals via satellite on the go, the unit need only be opened and the antenna hinged out and aimed at the desired satellite. Preferably, software is provided with the receiver/decoder electronics to assist in the aiming of the antenna. For example, a signal strength meter may be provided to give an indication of the strength of the presently received satellite signal. The signal strength meter gives an operator feedback to direct the aiming of the antenna. In addition, a stand or tripod may be provided for supporting and positioning the unit.

Figure 9:
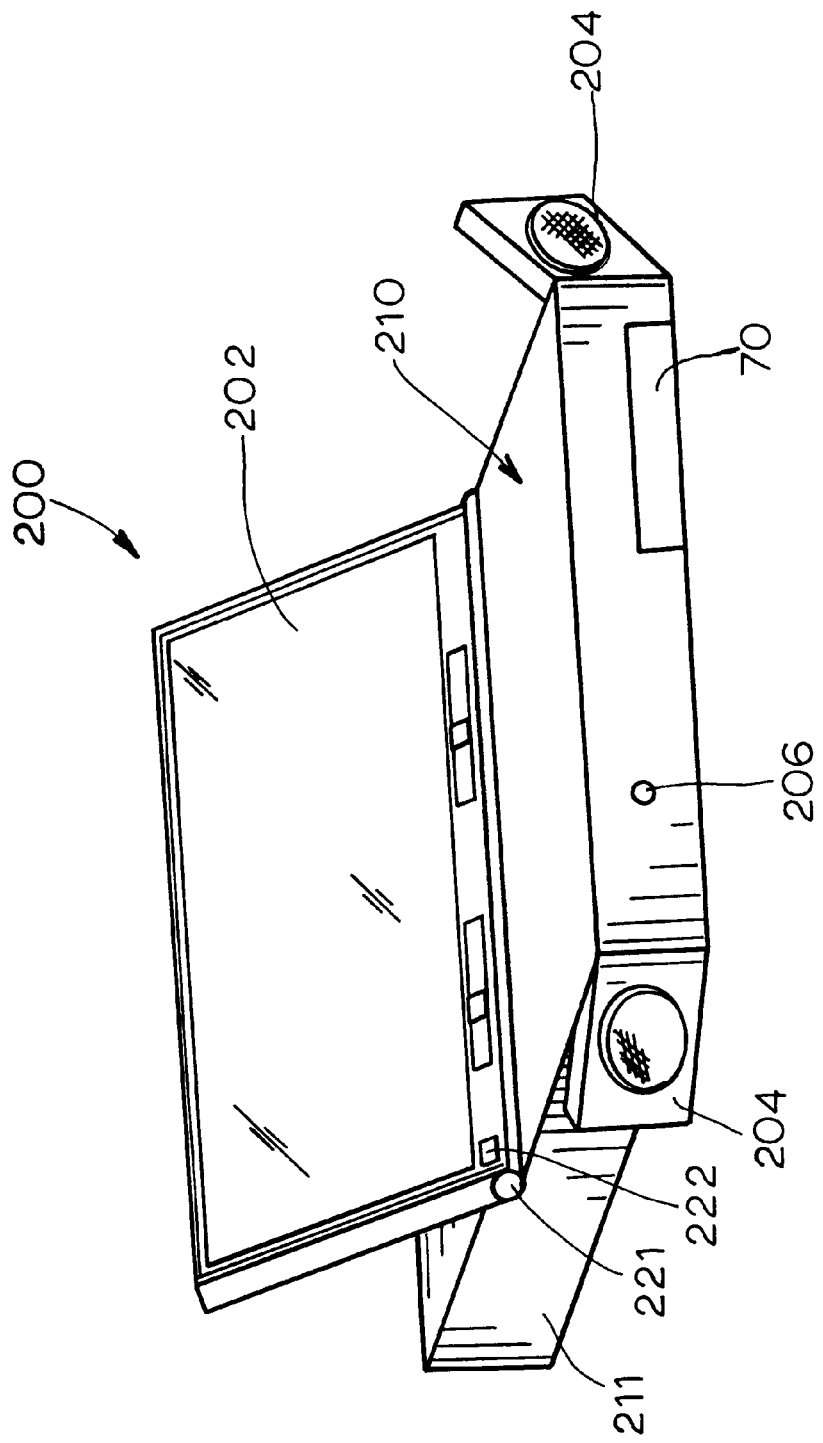
FIG. 9 shows a perspective front view of a further embodiment of the portable satellite earth station according to the present invention.
Figure 10:
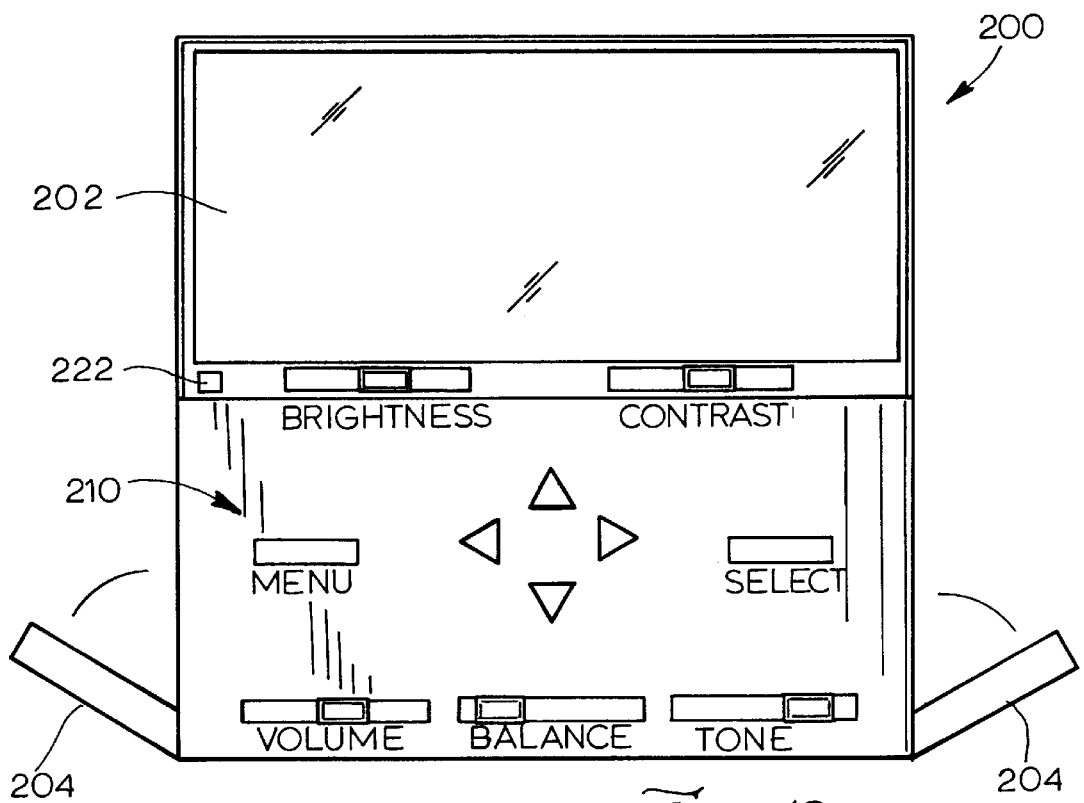
FIGS. 10 and 11 show plan and rear views of the portable satellite earth station of FIG. 9.

Referring now to FIGS. 9 and 10, a further embodiment of the present invention, which may be useful in, for example, campers, trailers, recreational vehicles or other mobile stations, comprises a portable receiver 200, such as a DSS® receiver, having a hinged flip-up color LCD viewing screen 202, fold-out stereo speakers 204, an earphone jack 206, an access card slot 70 for accepting smart cards or conditional access cards, and a user control panel 210 all integrated into a compact, unitary housing 211.

Figure 11:
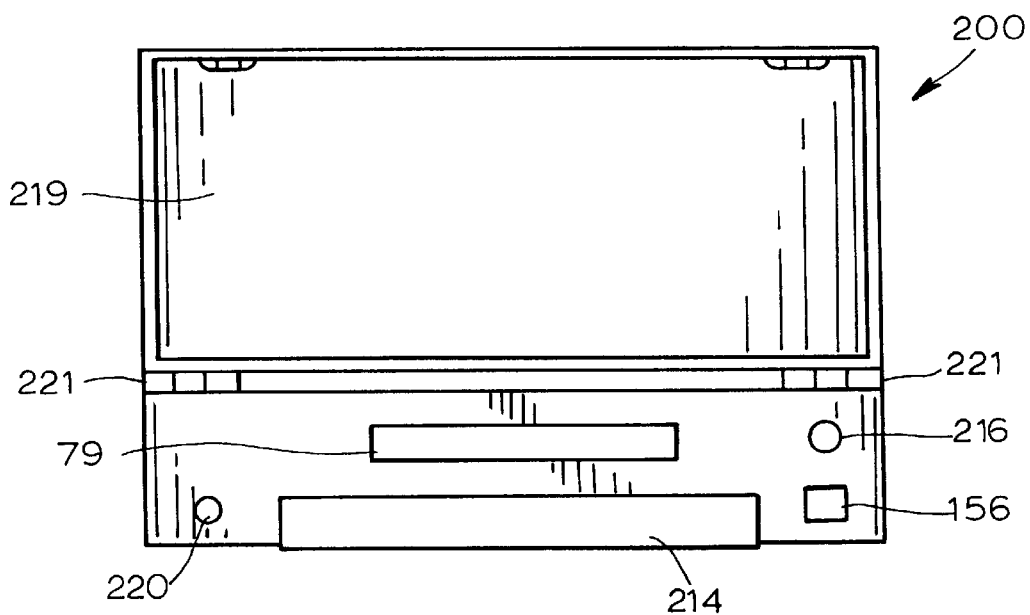

FIG. 11 illustrates the rear view of the portable receiver 200 which further comprises a PCMCIA slot 79, a removable battery/power conditioning pack 214, and jacks for an antenna, a telephone connection, and an external power connection, 216, 156, and 220, respectively. A flat antenna 219 may be hingeably disposed on the back of the flip-open section having the LCD viewing screen 202 disposed on an interior portion thereof. The antenna 219 may be protected during non-use with, for example, a slide-out panel.

The flip-up color LCD viewing screen 202, which is connected with a hinge 221 to the housing 211 of the portable receiver 200, enables a user to view downloaded video, text, data, images, etc. Additionally, the LCD viewing screen 202, when in the down or stowed position, serves to cover and protect the user control panel 210. Optionally, the flip-up LCD viewing screen 202 serves as a power switch for the portable receiver 200. Thus, when the viewing screen 202 is in the down position, the portable receiver 200 is powered down and when the viewing screen 202 is in the up position, the portable receiver 200 is powered up. A power switch 222 may be provided on the flip-open section to effect this function. The fold-out speakers 204 enable the user to hear downloaded (or locally generated) audio and can be folded back into the portable receiver housing 211 for unit storage or for transportation. Optionally, earphones may be connected to the receiver 200 via the earphone jack 206 to allow a user to use the portable receiver 200 in a private manner.

The user control panel 210 serves as an interface between the electronics of the receiver 200 and a user. Controls on the panel 210 may include, but are not limited to, brightness, contrast, volume, tone, and navigational controls such as directional keys, guide, and select keys. The navigational keys allow a user to interact with on-screen programming that may take place on the receiver 200. For example, the guide key may access an on-screen programming menu while the directional keys may provide a way to maneuver a cursor on the screen during programming. After positioning the cursor at a desired location, the select key may be used to inform the receiver 200 that the user wishes to activate or select the entity on which the cursor is placed. In preferred embodiments, some or all of the navigational and other controls are associated with specialized keys which are dedicated to the associated control functions. In particularly preferred embodiments these keys include shape, location, and/or indicies which serve to distinguish the dedicated function control keys from others, and to assist the user in controlling the device as described.

These and other functions may also be provided via a remote control unit. In these embodiments the portable receiver system 200 is further provided with appropriate remote control receiving circuits (e.g. RF or infra-red receivers).

The PCMCIA slot 79 allows for standard feature augmentation available with the use of PCMCIA cards. Furthermore, the antenna jack 216 may be used to couple signals from an external antenna (not shown) to the portable receiver 200. The telephone jack 156 provides an interface to a telco modem disposed within the portable receiver 200. The external power jack 220 provides power from an external power supply to the portable receiver 200 and may be used to recharge the removable battery/power conditioning unit 214.

Figure 12:
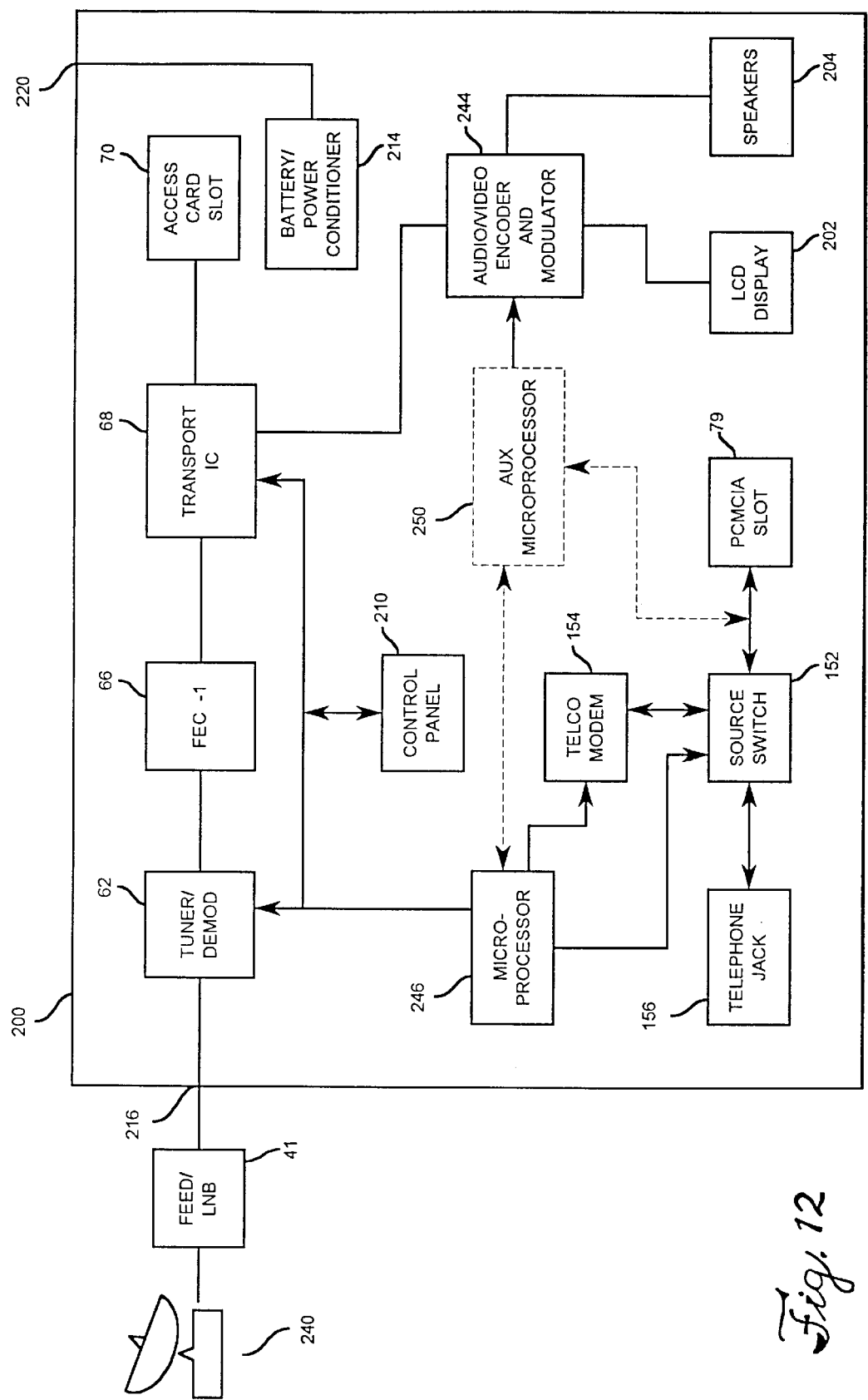
FIG. 12 shows a block diagram of the operational components of the portable satellite earth station of FIG. 9.

FIG. 12 illustrates a detailed diagram of the functional components of the portable receiver system 200. Note that the components of the portable receiver 200 of FIG. 12 that have been previously explained in connection with other embodiments are illustrated as having identical reference numbers.

As illustrated in FIG. 12, an external antenna 240 and a feed/LNB 41 supply the satellite downlink signal to a tuner/demodulator 62 via the antenna jack 216. Various antennas may be used with the portable receiver 200 including, for example, a 12"–18" parabolic antenna, a small tracking antenna suitable for reception of satellite downlink or other signals, as well as any other suitable antenna. Optionally, the flat antenna 219 may be used to receive a satellite signal.

The tuner/demodulator 62 downconverts and demodulates the L-band downlink signal to a time division multiplexed bitstream. The bitstream is passed to an inverse forward error correction block (FEC-$^{-1}$) 66 that applies error reduction algorithms, webitstrea in the art, to the bitstream. The tuner/demodulator 62 and the FEC-$^{-1}$ block 66 may be any desirable single chip demodulators and error correctors now available for DBS applications, as well as other known components.

The resulting output, which still comprises a time division multiplexed bitstream, is passed to a transport IC 68 which is used to perform real time operations at high speeds. The input bitstream is transferred into a memory in the transport IC 68 (not shown) and thereafter, a demultiplexer in the transport IC 68 (not shown) searches for packets of header data pertaining to MPEG data within the bitstream. The header, once found, is stored in a buffer within the transport IC 68. If the MPEG data is scrambled, a descrambler in the transport IC 68 decrypts this data using a decryption key received from an access card (not shown) that is inserted into an access card slot 70 (also commonly known in the art as a smart card slot or a conditional access module (CAM) slot). The transport IC 68 then buffers the decrypted MPEG data stream to the audio/visual encoder and modulator block 244.

The audio/visual encoder and modulator block 244 is equipped with MPEG decoders for both audio and video and operates in any known manner to decode the MPEG data stream to produce standard audio and video signals. After the audio and video signals have been decoded, the audio and the video data are sent to the speakers 204 and the LCD display 202, respectively.

A microprocessor 246 controls the tuner/demodulator 62, the transport IC 68, and a telco modem 154. The telco modem 154 interfaces with a source switch 152 which is connected to a telephone jack 156 and also interfaces with a PCMCIA card slot 79. As explained in connection with FIG. 7, the PCMCIA card slot 79 may be used to effect cellular telephone communications. Likewise, other types of PCMCIA cards may be inserted into the card slot 79 and interface with the microprocessor 246 to cause software in the microprocessor 246 and/or firmware in the receiver 200 to perform other desired functions. Alternatively or additionally, software supplied on PCMCIA cards may be used to augment the functionality of the microprocessor 246 or the firmware in the receiver 200. If desired, a personal computer may be attached to the receiver 200 and coupled to the PCMCIA card slot 79 to make the system into, for example, a DSS-PC receiver unit. The microprocessor 246 also interfaces with and accepts input from the control panel 210, which enables the user to control the receiver 200. The microprocessor 246 may control these features in any standard or known manner.

Optionally, an auxiliary microprocessor 250 may be added to the portable receiver 200. The auxiliary microprocessor 250 may be connected to the PCMCIA card slot, the microprocessor 246, the audio/video encoder and modulator 244, and/or any of the other functional components of the receiver 200 to allow direct access to the information contained on the PCMCIA cards. The information, programs, etc. on the PCMCIA cards can be accessed using, for example, the navigational controls of the portable receiver 200. In this manner, the auxiliary microprocessor 250 can perform functions associated with PCMCIA cards, such as providing maps, accessing GPS data, running programs, etc. at the same time that the microprocessor 246 is decoding satellite signals and/or displaying television channels.

If desired, the telco modem 154 may be a uni-directional, output only, modem. That is, the telco modem 154 may only be able to send information from the portable receiver 200. At prespecified times, the microcontroller 246 uses the telco modem 154 to upload the information stored on the access card to a subscription provider's computer for compilation. The system provider's computer can use the access card information for pay-per-view billing or other program data related tasks. As noted above, this information may be sent via a PCMCIA cellular phone connection card or via a hardwired connection through the telephone jack 156.

The portable receiver 200 is also equipped with a standard battery/power conditioning unit 214. The battery/power conditioning unit 214 may comprise rechargeable battery cells and power management circuitry. The power management circuitry monitors the system and only supplies power to necessary components. This serves to extend the life of the battery cells and enables the portable receiver 200 to attain maximum usage time from the battery cells per charge. The battery/power conditioning unit 214 is removable and may be recharged through the use of an external charging jack 220 which can be plugged into, for example, a 110V AC outlet, a D.C. automobile cigarette lighter, or a small solar cell array power supply. When plugged in, the portable receiver 200 receives its power from the source and charges the rechargeable cells. Alternate methods of recharging the battery/power conditioning unit 214 may also be used.

The portable satellite earth station described herein allows a satellite system subscriber, such as a DBS system subscriber, to receive and utilize digital satellite transmissions from a convenient, portable receiver unit. The various configurations of the satellite receiver equipment, including, for example, the flat receiver antenna, the receiver electronics, and the display screen allow satellite-transmitted data to be more easily accessed and utilized from remote locations.

Of course, it should be understood that a wide range of changes and modifications can be made to the preferred embodiments described above. For example, the portable satellite earth station may be provided without the satellite antenna to provide a portable satellite receiver and display. In such a case, a satellite antenna input is provided to connect an installed antenna to the portable unit. A subscriber may thus simply tote the satellite receiver and display to a location having an installed antenna without having to carry an external or separate antenna. In addition, the portable satellite earth station may have a video output so that a received image may be displayed on an external display monitor.

As described above, the portable satellite earth station may also include any desired configuration comprising a PCMCIA card slot and appropriate circuitry to allow the station to perform functions such as cellular modem use, PCS wireless access, RS-232 port emulation, additional memory or storage, GPS position location, or other functions. This configuration may be useful to, for example, enable a traveler to access a wireless network to, for example, check hotel or campsite availability.

Furthermore, the invention is not limited to receive-only applications, but may also incorporate transmit/receive applications. In this regard, the laptop computer 120 of FIG. 8 or the receiver 200 of FIG. 12 may be connected to receive satellite signals from an enclosure-mounted antenna and can run software to allow a user to participate in a video and/or audio teleconference with other satellite system participants. Accordingly, the enclosure may be fitted with a small video camera 121 and microphone 123 (illustrated in FIG. 8) to record video and audio signals for a video back link to provide two-way communication via satellite. A cellular modem may also be provided to enable the video camera 121 to transmit images via a terrestrial cellular communication link.

Furthermore, while the PCMCIA card slot 79 is described herein as being used with a portable receiver, the PCMCIA card slot 79 may also be provided on a stationary satellite receiver system, such an IRD used by the DSS® system. A PCMCIA card slot and associated interface hardware/software may be added directly within a stationary housing unit of such IRDs during the manufacturing thereof. Likewise, an external PCMCIA card slot and interface hardware/software may be connected to the data port of existing stationary or portable IRDs via, for example, a wire connector, to provide external PCMCIA functionality. Information on or control of the PCMCIA cards used in a stationary or a portable satellite receiver system can be accessed or provided through the use a remote control associated with the system.

Likewise, other alternative embodiments of the present invention could utilize various types of displays or methods of display, and different types of compact satellite receive antennas can be utilized within the scope of the invention described herein. Thus, it is intended that the foregoing detailed description be regarded as illustrative rather than limiting and that it be understood that it is the following claims, including all equivalents, which are intended to define the scope of this invention.

What is claimed is:

1. A device for receiving a video signal from a satillite, said device comprising:
   a hand-held support having a first portion movably connected to a second portion, said first portion being movable from a closed position with respect to the second portion to an open position with respect to the second portion;
   a satellite antenna supportably mounted to said hand-held support for receiving the video signal;
   a decoder operatively coupled to said satellite antenna including forward error correction logic that forward error corrects the video signal, wherein the decoder is fixably mounted to said hand-held support and is operational when the first portion is in the open position; and
   a display monitor operatively coupled to the decoder and mounted on said hand-held support, said display monitor being operational when the first portion is in the open position.

2. The device of claim 1 wherein said hand-held support further comprises a front side and a rear side, and the satellite antenna is mounted to the front side of said support.

3. The device of claim 2 wherein said display monitor is mounted to the rear side of said support.

4. The device of claim 1 wherein said hand-held support further comprises an enclosure including a cover and a base.

5. The device of claim 4 wherein said cover is removably connected to said base by a hinge.

6. The device of claim 5 wherein said satellite antenna is mounted to said cover.

7. The device of claim 6 wherein said display monitor is mounted to said base.

8. The device of claim 1 wherein said display monitor further comprises a flat-panel display and a portable personal computer.

9. The device of claim 1 wherein said display monitor is removably mounted to said support.

10. The device of claim 1 wherein said antenna is removably mounted to said hand-held support.

11. The device of claim 4 wherein said antenna is mounted on an outside of said enclosure.

12. A device for receiving a signal from a satellite, said device comprising:
    a hand-held support having a first portion and a second portion, the first portion connected by a hinge to the second portion, wherein said first portion is movable from a closed position with respect to the second portion to an open position with respect to the second portion;
    a satellite antenna mounted on said hand-held support;
    satellite receiver electronics supportably mounted on said hand-held support and operatively coupled to the satellite antenna;

a decoder fixably mounted on said hand-held support and in communication with said satellite receiver electronics; and a video display monitor mounted on said hand-held support and in communication with said decoder.

13. The device of claim 12 wherein said hand-held support comprises a unitary housing, wherein said satellite receiver electronics, and said decoder are disposed in the unitary housing and wherein said flat satellite antenna is mounted on said unitary housing.

14. The device of claim 12 further comprising user controls including keys adapted to control the decoder.

15. The device of claim 12 further comprising a PCMCIA card slot coupled to said decoder.

16. The device of claim 12 wherein said satellite antenna further comprises a continuous transverse stub antenna.

17. The device of claim 12 wherein said antenna is removably mounted to said support.

18. The device of claim 12 wherein said satellite receiver electronics further comprises:

a tuner/demodulator that receives signals from said satellite antenna, said tuner/demodulator in communication with said satellite antenna;

logic that forward error corrects said signals; and transport logic that decrypts said signals.

19. The device of claim 12 wherein said hand-held support further comprises an enclosure including a cover hingeably connected to a base.

20. The device of claim 19 wherein said satellite receiver electronics and said decoder are contained within said enclosure.

21. The device of claim 19 least one audio output mounted to said enclosure.

22. The device of claim 19 wherein said satellite antenna is mounted to said enclosure.

23. The device of claim 22 wherein said satellite antenna is mounted to said cover.

24. The device of claim 19 further comprising a display monitor mounted to said enclosure.

25. The device of claim 24 wherein said display monitor further comprises a flat-panel display and a portable personal computer.

26. A device for receiving a signal from a satellite, said device comprising:

an enclosure including a first mounting panel and a second mounting panel, said first panel connected by at least one hinge to said second panel, said panels movable from a closed position to an open position wherein in said open position said panels are separated by an acute angle about said hinge;

a satellite antenna positioned adjacent to said first panel; and a display monitor positioned adjacent to one of said panels.

27. The device as recited in claim 26 wherein said antenna is mounted on said first panel and said display monitor is mounted on said second panel, and said first panel and said second panel are detachable at said hinge.

28. The device as recited in claim 26 wherein said first panel and said second panel each include an outside face and an inside face, and said antenna is mounted on said outside face of said first panel and said display monitor is mounted on said outside face of said second panel.

29. The device as recited in claim 28 wherein said antenna is hingeably mounted to said outside face of said first panel to allow said antenna to be positionable away from the plane of said first panel.

30. The device as recited in claim 26 further comprising:

a tuner/demodulator that receives signals from said satellite antenna, said tuner/demodulator in communication with said satellite antenna; and a decoder in communication with said tuner/demodulator;

said tuner/demodulator and said decoder mounted on at least one of said inside faces of said panels.

31. A device for receiving a signal from a satellite, said device comprising:

a hand-held enclosure having a first portion movably connected to a second portion, wherein said first portion is movable from a closed position with respect to the second portion to an open position with respect to the second portion;

a satellite antenna supportably mounted to said hand-held enclosure that receives the signal from the satellite;

a tuner/demodulator operatively coupled to the satellite antenna to receive the satellite signal from said satellite antenna, said tuner/demodulator fixably housed within said hand-held enclosure;

a decoder fixably housed within said hand-held enclosure and including forward error correction logic that forward error corrects the satellite signal to produce a video signal; and a display monitor operatively coupled to the decoder that displays the video signal, said display monitor housed within said hand-held enclosure;

wherein said satellite antenna, said tuner/demodulator, said decoder and said display monitor are operational when the first portion is in the open position.

32. The device of claim 31 wherein said hand-held enclosure comprises a unitary housing.

33. The device of claim 32 further comprising fold-out speaker mounted within said unitary housing.

34. The device of claim 31 further comprising a PCMCIA card slot coupled to said decoder.

35. The device of claim 31 wherein said tuner/demodulator, tuner/demodulator, decoder, and display monitor are mounted to said hand-held enclosure using a plurality of dampening devices.

36. The device of claim 31 wherein said antenna is mounted to said hand-held enclosure using a hinge.

37. The device of claim 31 wherein said antenna further comprises a flat satellite antenna.

38. The device of claim 37 wherein said antenna further comprises a phased-array antenna.

39. The device of claim 37 wherein said antenna further comprises a continuous transverse stub element.

40. The device of claim 37 wherein said antenna is mounted within the interior of said hand-held enclosure.

41. The device of claim 31 wherein said decoder receives a digitally compressed video signal.

42. The device of claim 31 wherein said display further comprises a portable personal computer housed within said hand-held enclosure, said computer in communication with said decoder.

43. The device of claim 31 wherein said display further comprises a flat panel liquid-crystal display.

44. The device of claim 31 wherein said display further comprises a flat panel plasma gas display.

45. The device of claim 31 further comprising a visor for shading sunlight from said display.

46. The device of claim 31 further comprising a membrane sealing said enclosure to prevent water from reaching the interior of said enclosure.

47. The device of claim 31 further comprising a stand for supporting said hand-held enclosure.

48. The device of claim 31 further comprising a removable frame secured within said hand-held enclosure wherein said frame contains the tuner/demodulator and said decoder.

49. A device for receiving a signal from a satellite, said device comprising:

an enclosure including a base and a cover hinged to said base;

a satellite antenna mounted to said enclosure that receives satellite signals;

a tuner/demodulator that receives signals from said satellite antenna, said tuner/demodulator housed within said enclosure;

a decoder housed within said enclosure; and a display monitor displaying video signals, said display monitor housed within said enclosure.

50. The device of claim 49 wherein said cover may be retainably hinged in an open position.

51. The device of claim 50 further comprising at least one handle mounted to said enclosure.

52. A device for receiving a satellite signal from a satellite, said device comprising:

an enclosure;

a satellite antenna mounted to said enclosure that receives the satellite signal;

a tuner/demodulator that receives the satellite signal from said satellite antenna, said tuner/demodulator housed within said enclosure;

a decoder housed within said enclosure; and a display monitor displaying video signals, said display monitor housed within said enclosure;

wherein said enclosure comprises a plurality of walls and said antenna is mounted to receive said satellite signals through at least one of the plurality of walls of said enclosure.

53. The device of claim 52 wherein said at least one of the walls further comprises electromagnetically transparent plastic.

54. A device for receiving a signal from a satellite, said device comprising:

a hand-held support having a first portion movably connected to a second portion, wherein said first portion is movable from a closed position with respect to the second portion to an open position with respect to the second portion;

a display monitor mounted to said hand-held support;

a satellite antenna input fixably mounted to said hand-held support;

satellite receiver electronics fixably mounted to said hand-held support and communicatively coupled with said satellite antenna input; and forward error correction logic that forward error corrects the signal from the satellite;

wherein said display monitor, said satellite receiver electronics and said forward error correction logic are operational when the first portion is in the open position.

55. The device of claim 54 wherein said hand-held support further comprises a hinged enclosure.

56. The device of claim 55 wherein said satellite receiver electronics further comprises a tuner/demodulator that receives signals from said satellite antenna input, said tuner/demodulator in communication with said satellite antenna input;

logic that forward error corrects said signals; and transport logic that decrypts said signals.

57. The device of claim 56 further comprising a satellite antenna remote from said hand-held support.

58. The device of claim 57 wherein said satellite antenna input further comprises a removable jack that receives a cable from said satellite antenna.

59. A device for receiving a satellite signal from a satellite, said device comprising:

a hand-held housing having a first portion and a second portion, the first portion connected by a first hinge to the second portion, wherein said first portion is movable from a closed position with respect to the second portion to an open position with respect to the second portion;

a satellite antenna mounted to said hand-held housing; and a display monitor mounted within said hand-held housing.

60. A device for communicating via a satellite, said device comprising:

a hand-held portable housing having a first portion movably connected to a second portion, wherein said first portion is movable from a closed position with respect to the second portion to an open position with respect to the second portion;

a satellite antenna mounted within said hand-held portable housing;

a display monitor mounted within said hand-held portable housing;

a video camera mounted within said hand-held portable housing;

a microphone mounted within said hand-held portable housing; and a decoder fixably mounted to said hand-held portable housing and including forward error correction logic;

wherein said antenna, said display monitor, said video camera, said microphone, and said decoder are in communication with each other and cooperate to allow audio and video teleconferencing via a satellite with said device when the first portion is in the open position.

61. The device of claim 60 further comprising a cellular modem within said hand-held portable housing and in communication with said video camera.

62. A portable satellite earth station for decoding a satellite signal, comprising:

a unitary hand-held portable housing including a flip-open section having a first portion and a second portion, the first portion connected by a hinge to the second portion, wherein said first portion is movable from a closed position with respect to the second portion to an open position with respect to the second portion;

a display monitor disposed within the unitary hand-held portable housing;

a receiver for receiving the satellite signal; and a satellite signal decoder disposed within the unitary hand-held portable housing for decoding the satellite signal and providing the decoded signal to the display monitor.

63. The portable satellite earth station of claim 62, further including a fold-out speaker coupled to the decoder.

64. The portable satellite earth station of claim 62, further including an access card slot coupled to the decoder.

65. The portable satellite earth station of claim 64, wherein the access card slot is a smart card slot.

66. The portable satellite earth station of claim 62, wherein the display monitor includes an LCD monitor connected to the flip-open section of the hand-held portable housing.

67. The portable satellite earth station of claim 62, further including user controls disposed within the hand-held portable housing.

68. The portable satellite earth station of claim 67, wherein the user controls include dedicated keys adapted to control the decoding of the satellite signal.

69. The portable satellite earth station of claim 68, wherein the dedicated keys have shapes related to control functions associated with the keys.

70. The portable satellite earth station of claim 68, wherein the user controls include navigational controls.

71. The portable satellite earth station of claim 62, including a PCMCIA card slot coupled to the decoder.

72. The portable satellite earth station of claim 71, wherein the PCMCIA card is coupled to the decoder through a telephone modem and a microprocessor.

73. The portable satellite earth station of claim 72, further including a rechargeable battery pack coupled to the decoder, wherein the battery pack is adapted to be coupled through an external power jack to an external power supply.

74. The portable satellite earth station of claim 73, wherein the external power jack is adapted to be coupled to an external solar cell array power supply.

75. The portable satellite earth station of claim 62, further including a flat antenna disposed within the unitary hand-held portable housing.

76. The portable satellite earth station of claim 62, further including a battery/power conditioning unit.

77. A portable satellite earth station for decoding a satellite signal, comprising:

a unitary housing including a flip-open section;

a display monitor disposed within the unitary housing;

a receiver for receiving the satellite signal;

a satellite signal decoder disposed within the unitary housing for decoding the satellite signal and providing the decoded signal to the display monitor, wherein the display monitor includes an LCD monitor connected to the flip-open section of the housing; and a power switch on the flip-open section that provides power to the LCD monitor and to the decoder when the flip-open section is in an open position.

78. A portable satellite earth station including:

a hand-held portable housing having a first portion and a second portion, the first portion connected by a hinge to the second portion, wherein said first portion is movable from a closed position with respect to the second portion to an open position with respect to the second portion;

a receiver disposed within the hand-held portable housing adapted to receive a satellite signal;

a decoder disposed within the hand-held portable housing that decodes the satellite signal;

a microprocessor disposed within the hand-held portable housing coupled to the decoder that controls the decoder; and a PCMCIA card slot disposed within the hand-held portable housing and coupled to the microprocessor, wherein the PCMCIA card slot is adapted to receive a PCMCIA card for implementation via the microprocessor.

79. The satellite earth station of claim 78, wherein the PCMCIA card slot is adapted to accept a cellular communication PCMCIA card, and wherein the PCMCIA card slot is coupled to the microprocessor through a telephone communication modem.

80. The satellite earth station of claim 79, further including a telephone jack coupled to the telephone communication modem.

81. The satellite earth station of claim 80, wherein the PCMCIA card slot and the telephone jack are coupled to the telephone communication modem through a switch.

82. The satellite earth station of claim 78, wherein the microprocessor includes software for implementing functions associated with a PCMCIA card when the PCMCIA card is disposed within the PCMCIA card slot.

83. The satellite earth station of claim 78, wherein the microprocessor includes a first microprocessor portion that controls the decoder and a second microprocessor coupled to the PCMCIA card slot that is adapted to implement functions associated with a PCMCIA card when the PCMCIA card is disposed within the PCMCIA card slot.

84. The satellite earth station of claim 78, wherein the decoder, the microprocessor, and the PCMCIA card slot are all disposed within a portable unitary housing.

85. The satellite earth station of claim 78, wherein the decoder and the microprocessor are disposed within a portable unitary housing and wherein the PCMCIA card slot is disposed externally to the portable unitary housing and is coupled to the microprocessor via a wire connector.

86. The satellite earth station of claim 78, wherein the decoder, the microprocessor, and the PCMCIA card slot are all disposed within a stationary housing unit.

87. The satellite earth station of claim 78, wherein the earth station is stationary and the decoder and the microprocessor are disposed within a stationary housing unit and wherein the PCMCIA card slot is disposed externally to the stationary housing unit and is coupled to the stationary housing unit via a wire connector.

* * * * *